(12) United States Patent
Kawamura et al.

(10) Patent No.: US 12,202,448 B2
(45) Date of Patent: Jan. 21, 2025

(54) VEHICLE CLEANER SYSTEM

(71) Applicant: KOITO MANUFACTURING CO., LTD., Tokyo (JP)

(72) Inventors: Kazuki Kawamura, Shizuoka (JP); Kazuhiro Suzuki, Shizuoka (JP); Yusuke Funami, Shizuoka (JP); Yoshio Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 775 days.

(21) Appl. No.: 17/425,016

(22) PCT Filed: Dec. 24, 2019

(86) PCT No.: PCT/JP2019/050489
§ 371 (c)(1),
(2) Date: Jul. 22, 2021

(87) PCT Pub. No.: WO2020/153081
PCT Pub. Date: Jul. 30, 2020

(65) Prior Publication Data
US 2022/0080930 A1    Mar. 17, 2022

(30) Foreign Application Priority Data

Jan. 23, 2019 (JP) ................................ 2019-009592
Jan. 23, 2019 (JP) ................................ 2019-009593
Jan. 23, 2019 (JP) ................................ 2019-009594

(51) Int. Cl.
*B60S 1/60* (2006.01)
*B60S 1/48* (2006.01)
(Continued)

(52) U.S. Cl.
CPC ............... *B60S 1/606* (2013.01); *B60S 1/481* (2013.01); *B60S 1/563* (2013.01); *B60S 1/58* (2013.01)

(58) Field of Classification Search
None
See application file for complete search history.

(56) References Cited

U.S. PATENT DOCUMENTS

2008/0105789 A1*  5/2008  Smith ................. F16K 31/0675
                                                        244/171.1
2014/0009616 A1   1/2014  Nakamura et al.
(Continued)

FOREIGN PATENT DOCUMENTS

CN    102182603 A    9/2011
CN    108556800 A    9/2018
(Continued)

OTHER PUBLICATIONS

DE102016218331, For A Motor Vehicle, Hereby Equipped Cleaning System And Hereby Equipped Motor Vehicle, Herzonger (Year: 2018).*
(Continued)

Primary Examiner — Cristi J Tate-Sims
(74) Attorney, Agent, or Firm — Sughrue Mion, PLLC

(57) ABSTRACT

Provided is a vehicle cleaner system with which it can be ascertained which cleaner has broken down. A vehicle cleaner system comprises: a plurality of cleaner units; a motor pump; an electromagnetic valve which switches between allowing and denying the movement of a cleaning liquid; a cleaner control unit; and a plurality of protection determination units that protect the electromagnetic valve from being supplied with an overcurrent when the electromagnetic valve has short-circuited and is opened, and that notify the cleaner control unit that the electromagnetic valve has short-circuited and is opened. The cleaner control unit
(Continued)

outputs, to a vehicle control unit, which electromagnetic valve is unavailable for use, on the basis of a signal that is acquired from the protection determination units and that indicates that the electromagnetic valve has short-circuited and is opened.

5 Claims, 11 Drawing Sheets

(51) Int. Cl.
*B60S 1/56* (2006.01)
*B60S 1/58* (2006.01)

(56) References Cited

U.S. PATENT DOCUMENTS

| | | |
|---|---|---|
| 2014/0166109 A1 | 6/2014 | Takai et al. |
| 2018/0222452 A1* | 8/2018 | Krause ................ F16K 31/0675 |
| 2018/0290632 A1 | 10/2018 | Rice et al. |
| 2020/0114881 A1 | 4/2020 | Yamauchi et al. |
| 2020/0139936 A1* | 5/2020 | Yamauchi ................ B60S 1/36 |

FOREIGN PATENT DOCUMENTS

| | | |
|---|---|---|
| DE | 10 2016 218 331 A1 | 3/2018 |
| GB | 2 247 998 A | 3/1992 |
| JP | 61-105260 A | 5/1986 |
| JP | 4-121256 A | 4/1992 |
| JP | 2001-171491 A | 6/2001 |
| JP | 2014-11785 A | 1/2014 |
| WO | 2012/046264 A1 | 4/2012 |
| WO | 2019/012882 A1 | 1/2019 |
| WO | 2019/013138 A1 | 1/2019 |

OTHER PUBLICATIONS

International Search Report dated Mar. 17, 2020 issued by the International Searching Authority in counterpart International Application No. PCT/JP2019/050489 (PCT/ISA/210).

International Written Opinion dated Mar. 17, 2020 issued by the International Searching Authority in counterpart International Application No. PCT/JP2019/050489 (PCT/ISA/237).

Communication dated Feb. 4, 2022 issued by the European Patent Office in counterpart European Application No. 19910935.6.

Communication dated May 11, 2024, issued by the China National Intellectual Property Administration in Chinese Application No. 201980090002.5.

* cited by examiner

VEHICLE CLEANER SYSTEM

CROSS-REFERENCE TO RELATED APPLICATIONS

This application is a National Stage of International Application No. PCT/JP2019/050489 filed Dec. 24, 2019, claiming priority based on Japanese Patent Application No. 2019-009592, filed Jan. 23, 2019, Japanese Patent Application No. 2019-009593, filed Jan. 23, 2019, and Japanese Patent Application No. 2019-009594, filed Jan. 23, 2019, the contents of all of which are incorporated herein by reference in their entirety.

TECHNICAL FIELD

The present invention relates to a vehicle cleaner system.

BACKGROUND ART

In recent years, cameras have been mounted on vehicles. A camera outputs acquired information to a vehicle ECU or the like that controls a host vehicle. A vehicle cleaner that can clean such a camera with cleaning liquid is known in Patent Literature 1 and the like.

CITATION LIST

Patent Literature

Patent Literature 1: JP-A-2001-171491

SUMMARY OF INVENTION

Technical Problem

A plurality of cameras and sensors are mounted on a vehicle. It is conceivable to clean the plurality of cameras and sensors with the above-described vehicle cleaner. In this case, a vehicle cleaner system including a plurality of vehicle cleaners is conceivable to be integrally mounted on the vehicle.

The present invention provides a vehicle cleaner system capable of recognizing a failed cleaner.

Solution to Problem

According to an aspect of the present invention, there is provided a vehicle cleaner system.

The vehicle cleaner system includes: a plurality of cleaner units that discharge cleaning liquid toward objects to be cleaned mounted on a vehicle capable of traveling in an automatic driving mode;
a motor pump that supplies the cleaning liquid to the cleaner units;
electromagnetic valves that are each provided between a respective one of the cleaner units and the motor pump, the electromagnetic valves being configured to switch between permission and non-permission of movement of the cleaning liquid from the motor pump to the cleaner units;
a control module that controls the electromagnetic valves and the motor pump; and
a plurality of protection diagnosis units that are each provided in an electrical connection of a respective one of the electromagnetic valves and the control module, the plurality of protection diagnosis units being configured to protect an overcurrent from flowing through the electromagnetic valves when the electromagnetic valves are short-circuited and open-circuited and transmit the short circuit and the open circuit of the electromagnetic valves to the control module.

The control module outputs information on an unavailable electromagnetic valve to a vehicle control unit that controls the vehicle based on a signal indicating the short circuit and the open circuit of the electromagnetic valves acquired from the protection diagnosis units.

According to an aspect of the present invention, there is provided a vehicle cleaner system.

The vehicle cleaner system includes: a plurality of cleaner units that discharge cleaning liquid toward objects to be cleaned mounted on a vehicle;
a motor pump that supplies the cleaning liquid to the cleaner units;
normally closed electromagnetic valves that are each provided between a respective one of the cleaner units and the motor pump, the electromagnetic valves being configured to switch between permission and non-permission of movement of the cleaning liquid from the motor pump to the cleaner units;
a control module that controls energization from a power source to the normally closed electromagnetic valves and the motor pump to control the normally closed electromagnetic valves and the motor pump; and
a plurality of protection diagnosis units that are each provided in an electrical connection of a respective one of the electromagnetic valves and the control module, the plurality of protection diagnosis units being configured to protect an overcurrent from flowing through the electromagnetic valves when the electromagnetic valves are short-circuited and open-circuited and transmit the short circuit and the open circuit of the electromagnetic valves to the control module.

The control module stops the motor pump when a signal indicating the short circuit and the open circuit of the electromagnetic valves is acquired from the protection diagnosis units.

According to an aspect of the present invention, there is provided a vehicle cleaner system.

The vehicle cleaner system includes: a plurality of cleaner units that discharge cleaning liquid toward objects to be cleaned mounted on a vehicle;
a motor pump that supplies the cleaning liquid to the cleaner units;
normally closed electromagnetic valves that are each provided between a respective one of the cleaner units and the motor pump, the electromagnetic valves being configured to switch between permission and non-permission of movement of the cleaning liquid from the motor pump to the cleaner units;
a cleaner control unit that controls energization from a power source to the normally closed electromagnetic valves to control opening and closing of the normally closed electromagnetic valves.

The cleaner control unit performs PWM control after the normally closed electromagnetic valves are opened.

Advantageous Effects of Invention

According to the present invention, there is provided a vehicle cleaner system capable of recognizing a failed cleaner.

According to the present invention, there is provided a vehicle cleaner system including an electromagnetic valve having good responsiveness.

BRIEF DESCRIPTION OF DRAWINGS

FIG. 11A shows an open state and a closed state of the electromagnetic valve. FIG. 11B shows a change in a voltage to be applied to the electromagnetic valve. FIG. 11C shows a temperature change of a coil of the electromagnetic valve.

FIG. 12A shows an open state and a closed state of the electromagnetic valve. FIG. 12B shows a change in a voltage to be applied to the electromagnetic valve. FIG. 12C shows a temperature change of a coil of the electromagnetic valve.

DESCRIPTION OF EMBODIMENTS

Figure 1:
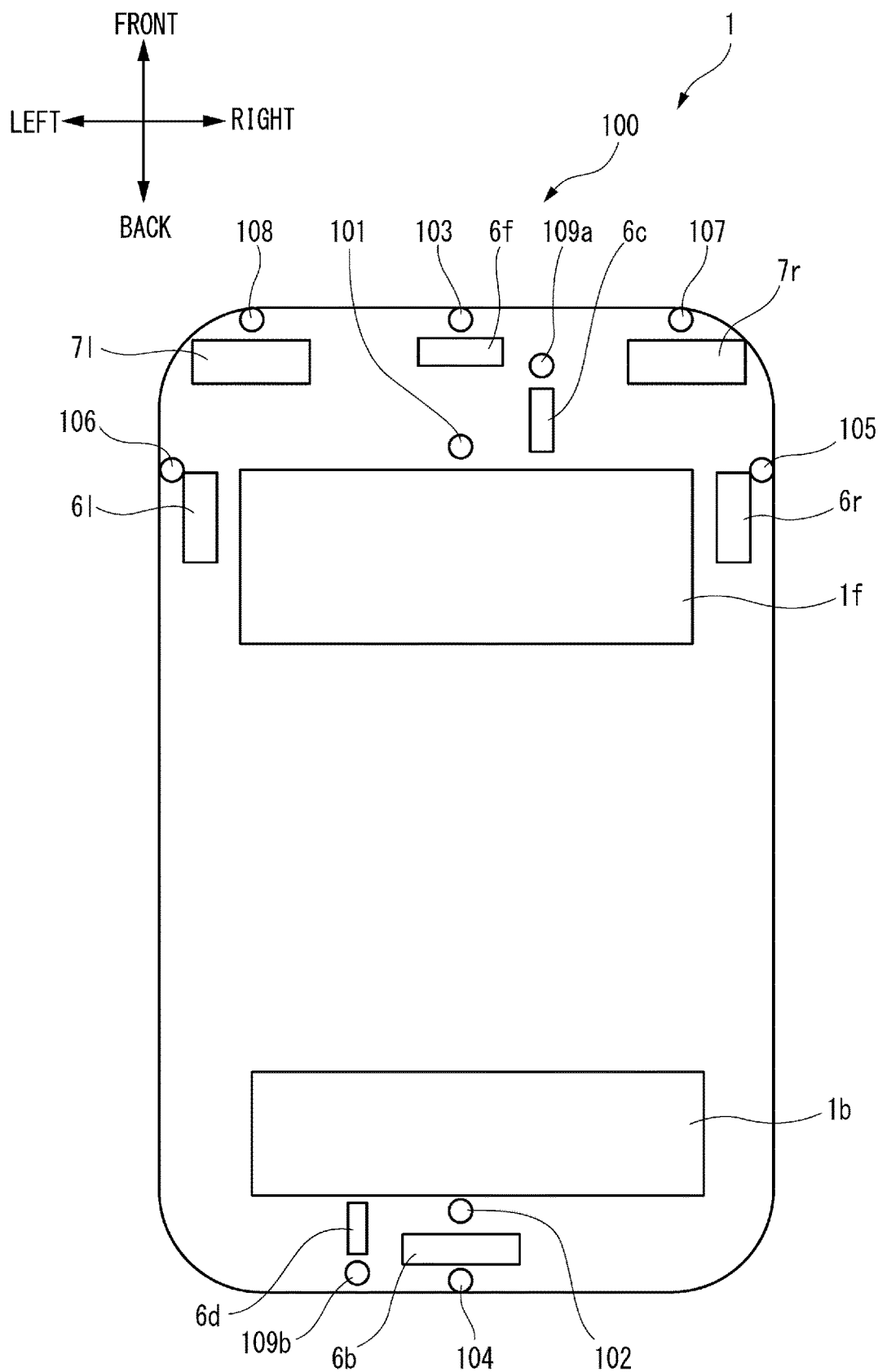
FIG. 1 is a top view of a vehicle equipped with a cleaner system.

Hereinafter, a first embodiment of the present invention will be described with reference to the drawings. Descriptions of members having the same reference numerals as those having been described in the description of the present embodiment will be omitted for convenience of description. Further, dimensions of members shown in the drawings may be different from actual dimensions thereof for convenience of description.

In the description of the present embodiment, a "left-right direction", a "front-back direction", and an "up-down direction" are appropriately referred to for convenience of description. These directions are relative directions set for a vehicle 1 shown in FIG. 1. Here, the "up-down direction" includes an "upward direction" and a "downward direction". The "front-back direction" includes a "frontward direction" and a "backward direction". The "left-right direction" includes a "leftward direction" and a "rightward direction".

FIG. 1 is a top view of the vehicle 1 equipped with a vehicle cleaner system 100 (hereinafter, referred to as the cleaner system 100) according to the present embodiment. The vehicle 1 includes the cleaner system 100. In the present embodiment, the vehicle 1 is an automobile that can travel in an automatic driving mode.

Figure 2:
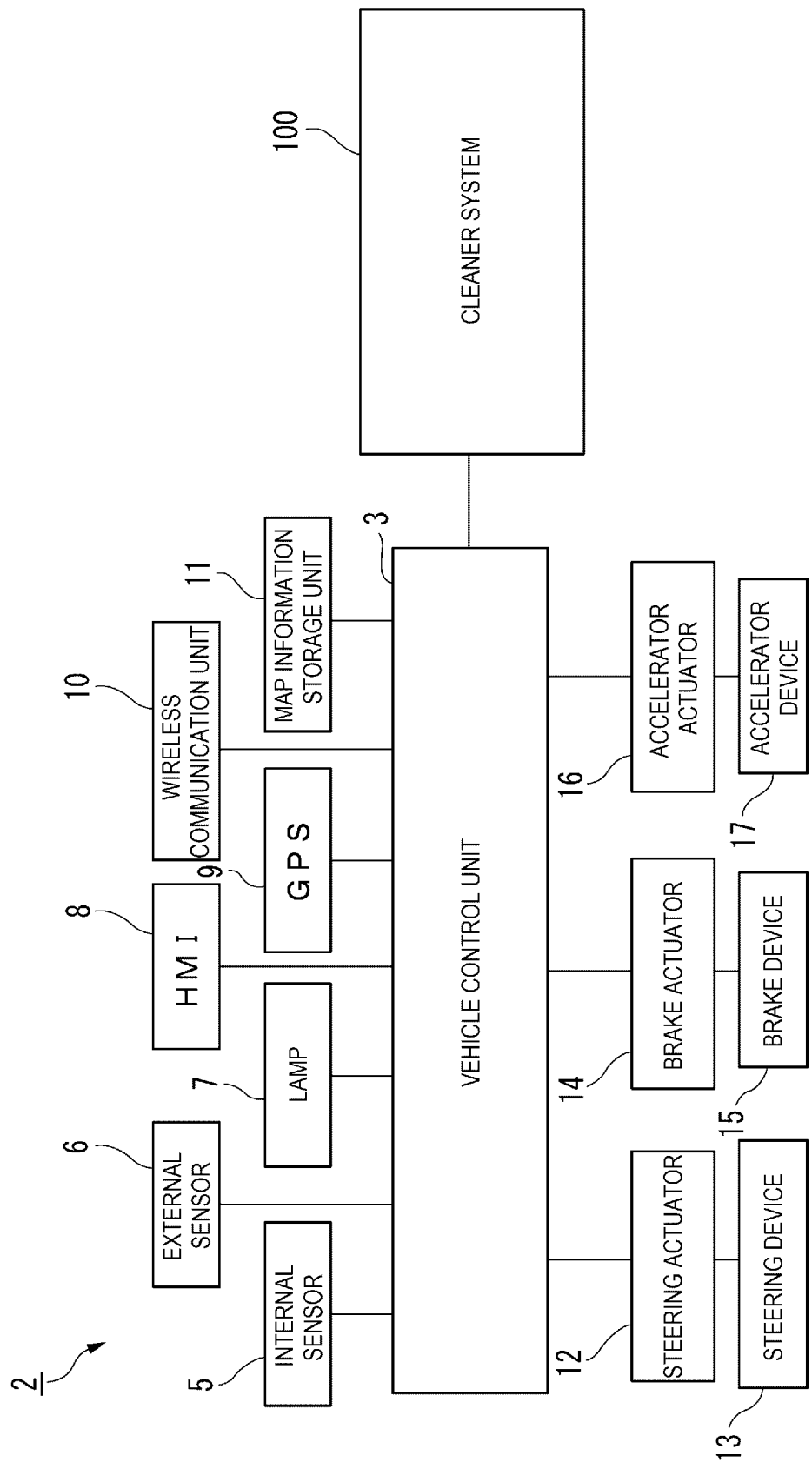
FIG. 2 is a block diagram of a vehicle system.

First, a vehicle system 2 of the vehicle 1 will be described with reference to FIG. 2. FIG. 2 is a block diagram of the vehicle system 2. As shown in FIG. 2, the vehicle system 2 includes a vehicle control unit 3, an internal sensor 5, an external sensor 6, a lamp 7, a human-machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 includes an electronic control unit (ECU). The vehicle control unit 3 includes a processor such as a central processing unit (CPU), a read only memory (ROM) that stores various vehicle control programs, and a random access memory (RAM) that temporarily stores vehicle control data. The processor loads a program designated from the various vehicle control programs stored in the ROM onto the RAM and executes processing in cooperation with the RAM. The vehicle control unit 3 controls traveling of the vehicle 1.

The internal sensor 5 is a sensor that can acquire information on a host vehicle. The internal sensor 5 is, for example, at least one of an acceleration sensor, a speed sensor, a wheel speed sensor, and a gyro sensor. The internal sensor 5 acquires information on the host vehicle, including a traveling state of the vehicle 1, and outputs the information to the vehicle control unit 3.

The internal sensor 5 may include a seating sensor that detects whether a driver is seated in a driver seat, a face direction sensor that detects a direction of the face of the driver, a human sensor that detects a person in the vehicle, and the like.

The external sensor 6 is a sensor that can acquire information on the outside of the host vehicle. The external sensor is, for example, at least one of a camera, a radar, and a LiDAR. The external sensor 6 acquires information on the outside of the host vehicle, including a surrounding environment of the vehicle 1 (another vehicle, a pedestrian, a road shape, a traffic sign, an obstacle, and the like), and outputs the information to the vehicle control unit 3. Alternatively, the external sensor 6 may include a weather sensor that detects a weather condition, a luminance sensor that detects luminance of the surrounding environment of the vehicle 1, and the like.

The camera is, for example, a camera including an imaging element such as a charge-coupled device (CCD) or a complementary MOS (CMOS). The camera is a camera that detects visible light or an infrared camera that detects infrared rays.

The radar is a millimeter-wave radar, a microwave radar, a laser radar, and the like.

The LiDAR is an abbreviation for light detection and ranging or laser imaging detection and ranging. The LiDAR is a sensor that generally emits non-visible light frontward and acquires information such as a distance to an object, a shape of the object, a material of the object, and a color of the object based on the emitted light and returning light.

The lamp 7 is at least one of a headlamp or a position lamp provided at a front portion of the vehicle 1, a back combination lamp provided at a back portion of the vehicle 1, a turn signal lamp provided at the front portion or a side portion of the vehicle, and various lamps for notifying a pedestrian and a driver of another vehicle of a status of the host vehicle.

The HMI 8 includes an input unit that receives an input operation from the driver and an output unit that outputs traveling information and the like to the driver. The input unit includes a steering wheel, an accelerator pedal, a brake pedal, a driving mode changeover switch for switching a driving mode of the vehicle 1, and the like. The output unit is a display that displays traveling information.

The GPS 9 acquires current position information on the vehicle 1 and outputs the acquired current position information to the vehicle control unit 3. The wireless communication unit 10 receives traveling information of another vehicle around the vehicle 1 from the other vehicle and transmits traveling information on the vehicle 1 to the other vehicle (vehicle-to-vehicle communication). The wireless communication unit 10 further receives infrastructure information from infrastructure equipment such as a traffic light or a sign lamp and transmits the traveling information on the vehicle 1 to the infrastructure equipment (road-to-vehicle communication). The map information storage unit 11 is an external storage device such as a hard disk drive that stores map information, and outputs the map information to the vehicle control unit 3.

When the vehicle 1 travels in the automatic driving mode, the vehicle control unit 3 automatically generates at least one of a steering control signal, an accelerator control signal, and a brake control signal based on the traveling state information, the surrounding environment information, the current position information, the map information, and the like. The steering actuator 12 receives the steering control signal from the vehicle control unit 3 and controls the steering device 13 based on the received steering control signal. The brake actuator 14 receives the brake control signal from the vehicle control unit 3 and controls the brake device 15 based on the received brake control signal. The accelerator actuator 16 receives the accelerator control signal from the vehicle control unit 3 and controls the accelerator device 17 based on the received accelerator control signal. In this way, in the automatic driving mode, the traveling of the vehicle 1 is automatically controlled by the vehicle system 2.

On the other hand, when the vehicle 1 travels in a manual driving mode, the vehicle control unit 3 generates the steering control signal, the accelerator control signal, and the brake control signal in accordance with a manual operation of the driver on the accelerator pedal, the brake pedal, and the steering wheel. In this way, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automatic driving mode and the manual driving mode. The automatic driving mode includes a fully automatic driving mode, an advanced driving support mode, and a driving support mode. In the fully automatic driving mode, the vehicle system 2 automatically executes all of the traveling control including steering control, brake control, and accelerator control, and the driver cannot drive the vehicle 1. In the advanced driving support mode, the vehicle system 2 automatically executes all of the traveling control including the steering control, the brake control, and the accelerator control, and the driver can drive the vehicle 1 but does not drive the vehicle 1. In the driving support mode, the vehicle system 2 automatically executes a part of the traveling control including the steering control, the brake control, and the accelerator control, and the driver drives the vehicle 1 under driving support of the vehicle system 2. On the other hand, in the manual driving mode, the vehicle system 2 does not automatically perform the traveling control, and the driver drives the vehicle 1 without the driving support of the vehicle system 2.

The driving mode of the vehicle 1 may be switched by operating the driving mode changeover switch. In this case, the vehicle control unit 3 switches the driving mode of the vehicle 1 among four driving modes (the fully automatic driving mode, the advanced driving support mode, the driving support mode, and the manual driving mode) according to an operation of the driver on the driving mode changeover switch. The driving mode of the vehicle 1 may be automatically switched based on information about a traveling permitted section where an automatic driven vehicle can travel or about a traveling prohibited section where traveling of the automatic driven vehicle is prohibited, or information about an external weather condition. In this case, the vehicle control unit 3 switches the driving mode of the vehicle 1 based on the information described above. Further, the driving mode of the vehicle 1 may be automatically switched using the seating sensor, the face direction sensor, and the like. In this case, the vehicle control unit 3 switches the driving mode of the vehicle 1 based on output signals from the seating sensor and the face direction sensor.

Referring back to FIG. 1, the vehicle 1 includes, as the external sensor 6, a front LiDAR 6f, a back LiDAR 6b, a right LiDAR 6r, a left LiDAR 6l, a front camera 6c, and a back camera 6d. The front LiDAR 6f acquires information on a front side of the vehicle 1. The back LiDAR 6b acquires information on a back side of the vehicle 1. The right LiDAR 6r acquires information on a right side of the vehicle 1. The left LiDAR 6l acquires information on a left side of the vehicle 1. The front camera 6c acquires information on the front side of the vehicle 1. The back camera 6 d acquires information on the back side of the vehicle 1.

In the example shown in FIG. 1, the front LiDAR 6f is provided at the front portion of the vehicle 1, the back LiDAR 6b is provided at the back portion of the vehicle 1, the right LiDAR 6r is provided at a right portion of the vehicle 1, and the left LiDAR 6l is provided at a left portion of the vehicle 1. Alternatively, the present invention is not limited thereto. For example, the front LiDAR, the back LiDAR, the right LiDAR, and the left LiDAR may be collectively arranged on a ceiling of the vehicle 1.

The vehicle 1 includes, as the lamp 7, a right headlamp 7r and a left headlamp 7l. The right headlamp 7r is provided at a right portion of the front portion of the vehicle 1, and the left headlamp 7l is provided at a left portion of the front portion of the vehicle 1. The right headlamp 7r is provided on a right side relative to the left headlamp 7l.

The vehicle 1 includes a front window 1f and a back window 1b.

The vehicle 1 includes the cleaner system 100 according to the embodiment of the present invention. The cleaner system 100 is a system that removes foreign matters such as water droplets, mud, and dust adhering to an object to be cleaned using a cleaning medium. In the present embodiment, the cleaner system 100 includes a front window washer (hereinafter, referred to as the front WW) 101, a back window washer (hereinafter, referred to as the back WW) 102, a front LiDAR cleaner (hereinafter referred to as the front LC) 103, a back LiDAR cleaner (hereinafter, referred to as the back LC) 104, a right LiDAR cleaner (hereinafter referred to as the right LC) 105, a left LiDAR cleaner (hereinafter, referred to as the left LC) 106, a right headlamp cleaner (hereinafter referred to as the right HC) 107, a left headlamp cleaner (hereinafter referred to as the left HC) 108, a front camera cleaner 109a, and a back camera cleaner 109b. Each of the cleaners 101 to 109b includes one or more nozzles, and discharges the cleaning medium such as cleaning liquid or air from the nozzles toward an object to be cleaned.

The front WW 101 can clean the front window 1f. The back WW 102 can clean the back window 1b. The front LC 103 can clean the front LiDAR 6f. The back LC 104 can clean the back LiDAR 6b. The right LC 105 can clean the right LiDAR 6r. The left LC 106 can clean the left LiDAR 6l. The right HC 107 can clean the right headlamp 7r. The left HC 108 can clean the left headlamp 7l. The front camera cleaner 109a can clean the front camera 6c. The back camera cleaner 109b can clean the back camera 6d. In the following description, the front camera cleaner 109a and the back camera cleaner 109b may be collectively referred to as camera cleaners 109.

Figure 3:
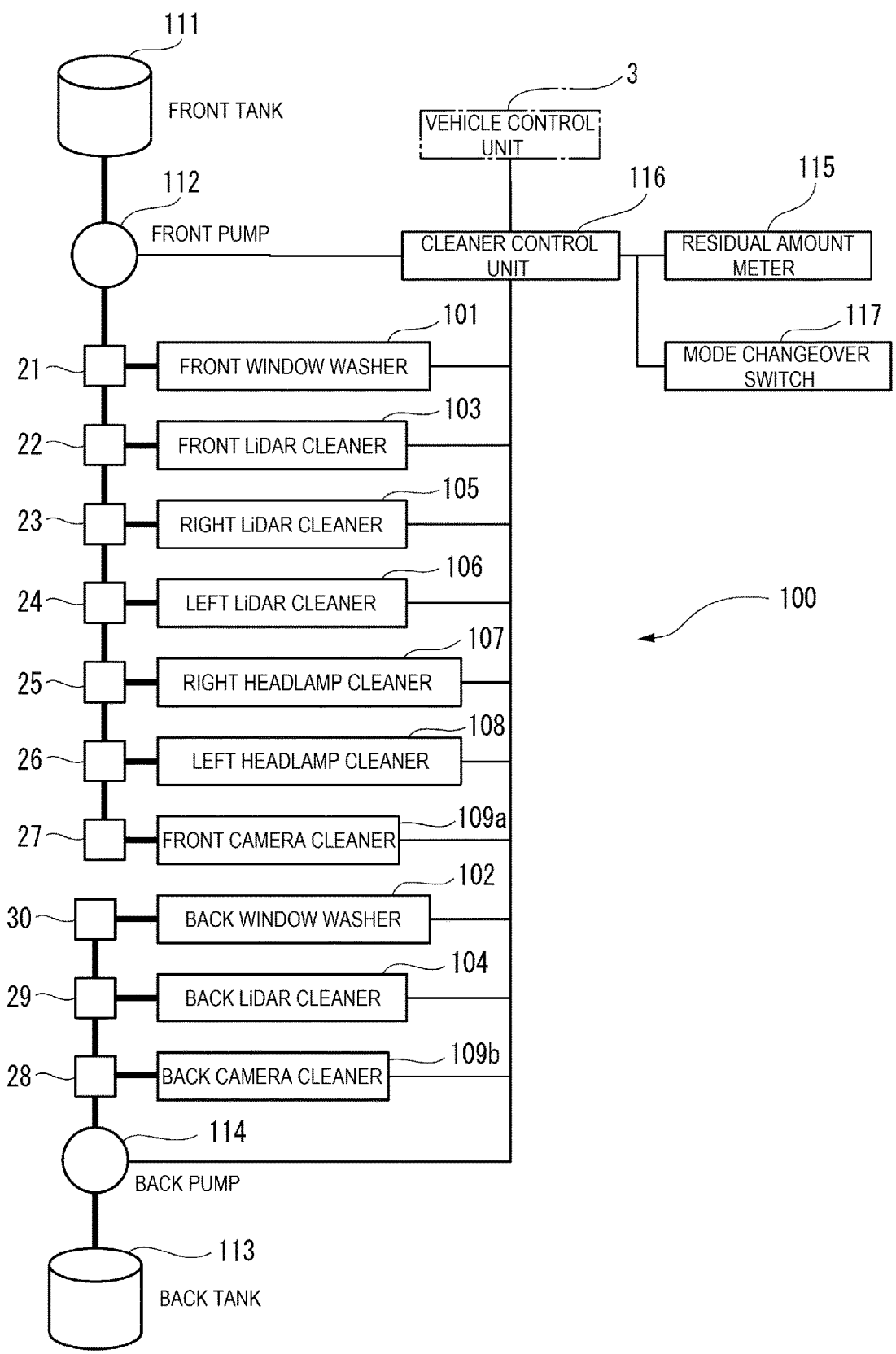
FIG. 3 is a block diagram of the cleaner system.

FIG. 3 is a block diagram of the cleaner system 100. The cleaner system 100 includes a front tank 111, a front pump 112, a back tank 113, a back pump 114, and a cleaner control unit 116, in addition to the cleaners 101 to 109b.

The front WW 101, the front LC 103, the right LC 105, the left LC 106, the right HC 107, the left HC 108, and the front camera cleaner 109a are connected to the front tank 111 via the front pump 112. The front pump 112 sends the cleaning liquid stored in the front tank 111 to the front WW 101, the front LC 103, the right LC 105, the left LC 106, the right HC 107, the left HC 108, and the front camera cleaner 109a.

The back WW 102, the back LC 104, and the back camera cleaner 109b are connected to the back tank 113 via the back pump 114. The back pump 114 sends the cleaning liquid stored in the back tank 113 to the back WW 102, the back LC 104, and the back camera cleaner 109b.

Each of the cleaners 101 to 109b is provided with an actuator that opens the nozzles to discharge the cleaning liquid to the object to be cleaned. The actuator provided in each of the cleaners 101 to 109b is electrically connected to the cleaner control unit 116. The cleaner control unit 116 is also electrically connected to the front pump 112, the back pump 114, and the vehicle control unit 3.

In the cleaner system 100 according to the first embodiment of the present invention, the cleaner control unit 116 outputs signals for operating the sensor cleaners 103 to 106 and 109 to the sensor cleaners 103 to 106 and 109 based on signals output from the vehicle control unit.

As shown in FIG. 3, the cleaner system 100 according to the present embodiment includes a first electromagnetic valve 21 provided in a pipe connecting the front pump 112 and the front WW 101, a second electromagnetic valve 22 provided in a pipe connecting the first electromagnetic valve 21 and the front LC 103, a third electromagnetic valve 23 provided in a pipe connecting the second electromagnetic valve 22 and the right LC 105, a fourth electromagnetic valve 24 provided in a pipe connecting the third electromagnetic valve 23 and the left LC 106, a fifth electromagnetic valve 25 provided in a pipe connecting the fourth electromagnetic valve 24 and the right HC 107, a sixth electromagnetic valve 26 provided in a pipe connecting the fifth electromagnetic valve 25 and the left HC 108, and a seventh electromagnetic valve 27 provided in a pipe connecting the sixth electromagnetic valve 26 and the front camera cleaner 109a.

The cleaner system 100 further includes an eighth electromagnetic valve 28 provided in a pipe connecting the back pump 114 and the back camera cleaner 109b, a ninth electromagnetic valve 29 provided in a pipe connecting the eighth electromagnetic valve 28 and the back LC 104, and a tenth electromagnetic valve 30 provided in a pipe connecting the ninth electromagnetic valve 29 and the back WW 102.

Figure 4:
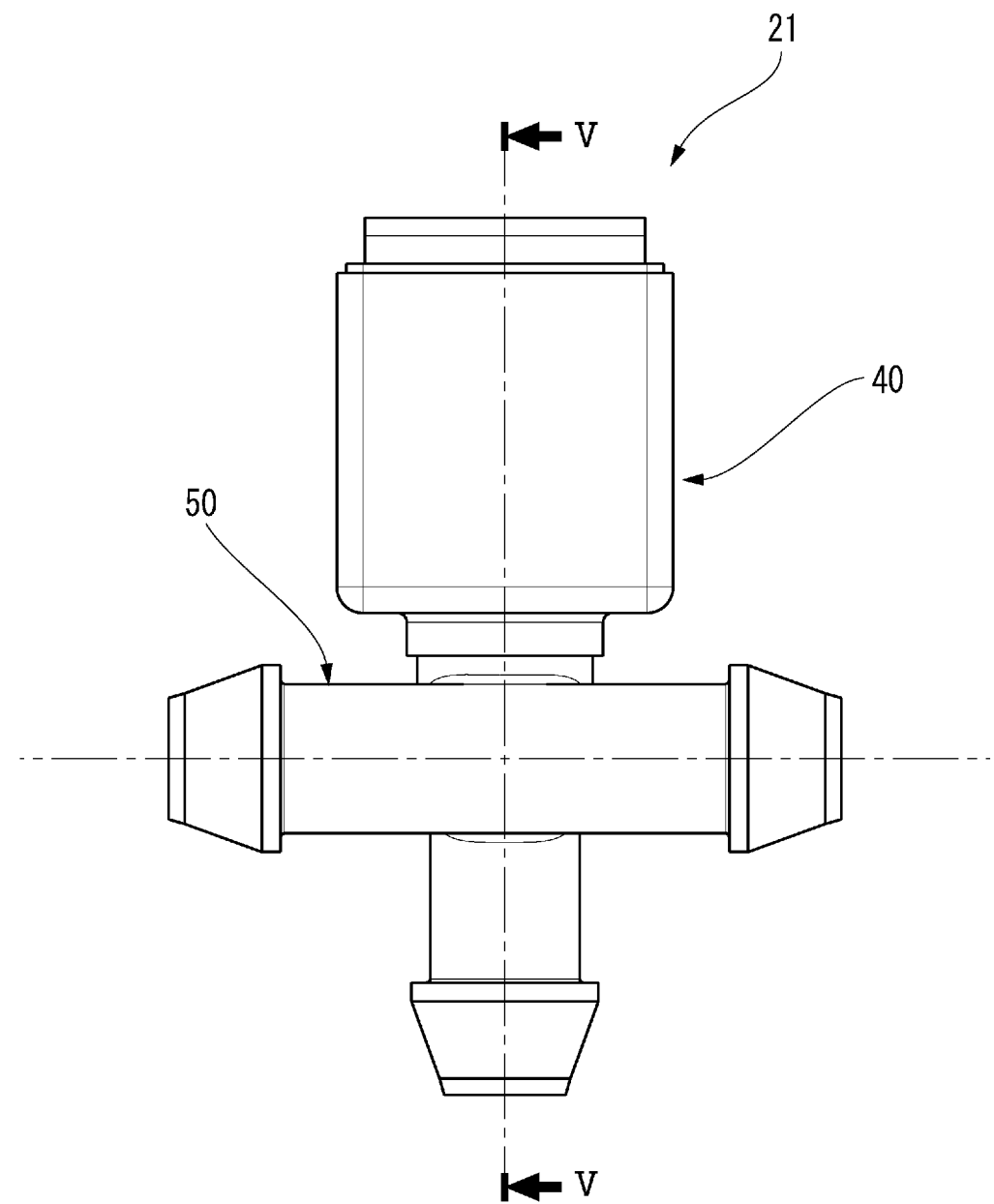
FIG. 4 is a front view of a first electromagnetic valve.

The first electromagnetic valve 21 to the tenth electromagnetic valve 30 have the same configuration. The first electromagnetic valve 21 will be described with reference to FIGS. 4 to 8. FIG. 4 is a front view of the first electromagnetic valve 21. As shown in FIG. 4, the first electromagnetic valve 21 includes a first pipe 40 and a second pipe 50. The first electromagnetic valve 21 is switchable between a first state in which the cleaning liquid discharged from the front pump 112 and flowing into the first electromagnetic valve 21 is allowed to be sent to the front WW 101 and a second state in which the cleaning liquid discharged from the front pump 112 and flowing into the first electromagnetic valve 21 is not sent to the front WW 101.

Figure 5:
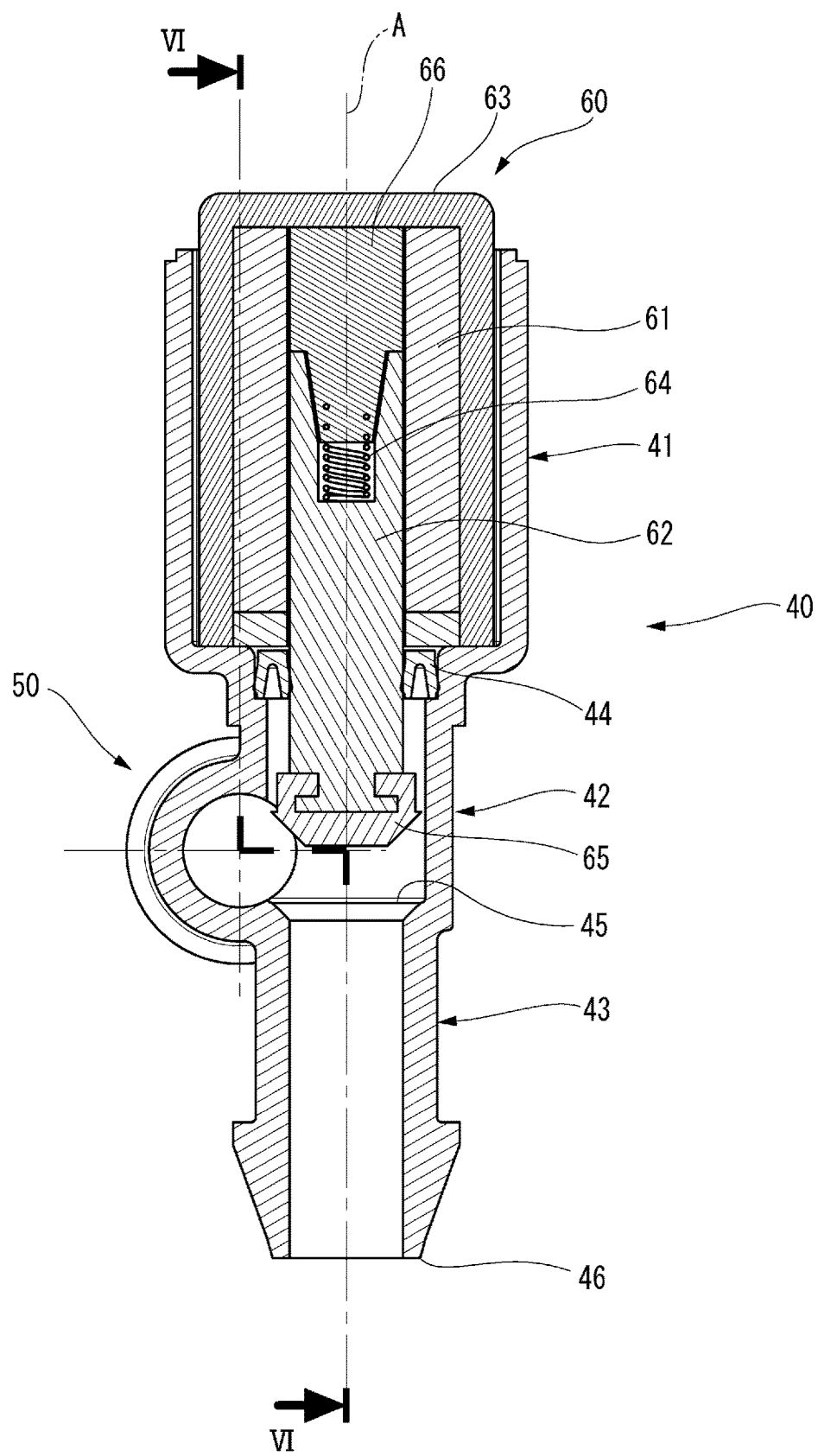
FIG. 5 is a sectional view in a first state taken along a line V-V of FIG. 4.
Figure 6:
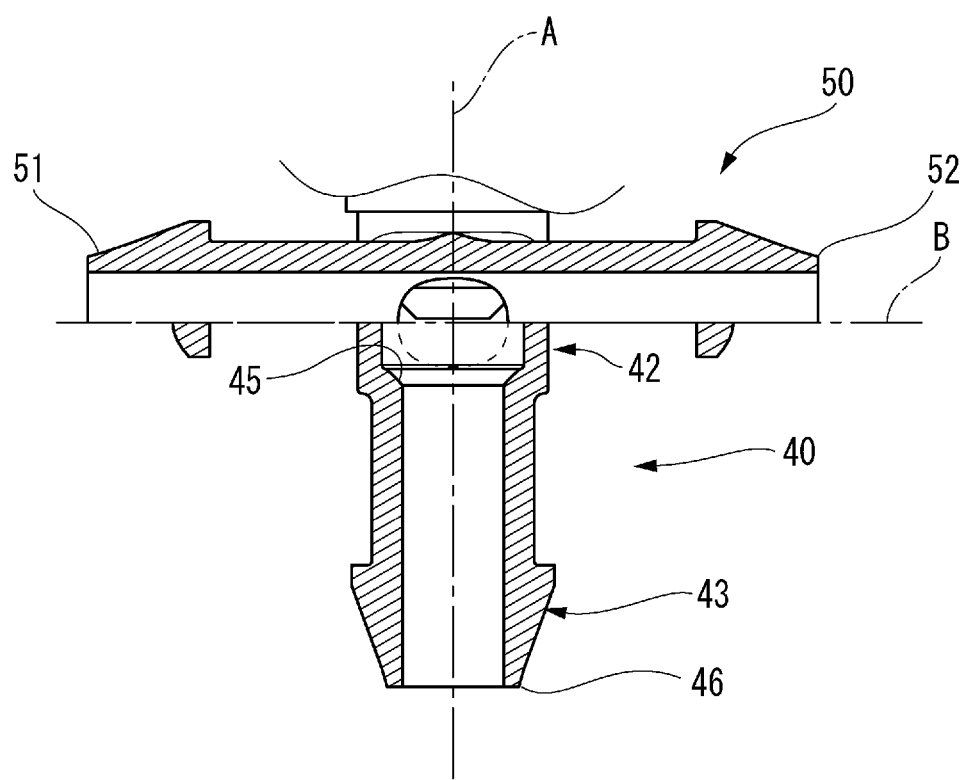
FIG. 6 is a sectional view taken along a line VI-VI of FIG. 5.

FIG. 5 is a sectional view in the first state taken along a line V-V of FIG. 4. FIG. 6 is a sectional view taken along a line VI-VI of FIG. 5. As shown in FIGS. 5 and 6, the first pipe 40 extends along a first axis A. The cleaning liquid basically flows in the first pipe 40 from up to down in FIG. 5. The first pipe 40 includes three portions having different inner diameters. The three portions are referred to as a housing portion 41, an upstream portion 42, and a downstream portion 43 from an upstream side toward a downstream side. The inner diameter of the housing portion 41 is larger than the inner diameter of the upstream portion 42 and the inner diameter of the downstream portion 43. The inner diameter of the upstream portion 42 is smaller than the inner diameter of the housing portion 41 and larger than the inner diameter of the downstream portion 43. The inner diameter of the downstream portion 43 is smaller than the inner diameter of the housing portion 41 and the inner diameter of the upstream portion 42.

The housing portion 41 houses a solenoid 60. The solenoid 60 includes a coil 61 (stator), a movable element 62, a yoke 63, and a spring 64. The spring 64 is provided between the yoke 63 and the movable element 62 in a non-compressed state. The movable element 62 is linearly displaceable along the first axis A. The movable element 62 is provided with a sealing portion 65 at a top end thereof in the moving direction (top end opposite to the spring 64). The sealing portion 65 is formed of an elastically deformable material such as rubber.

The movable element 62 crosses the housing portion 41 and the upstream portion 42. A seal member 44 is provided in the vicinity of a boundary between the housing portion 41 and the upstream portion 42. The seal member 44 is in sliding contact with an outer peripheral surface of the movable element 62. The seal member 44 allows the movable element 62 to move along the moving direction while preventing the cleaning liquid from entering the housing portion 41 from the upstream portion 42. That is, the cleaning liquid does not enter the housing portion 41.

The first pipe 40 and the second pipe 50 merge in the upstream portion 42 (merging portion). The cleaning liquid flown through the second pipe 50 enters the first pipe 40 in the upstream portion 42. At a boundary between the upstream portion 42 and the downstream portion 43, a reception pedestal 45 is provided downstream of the merging portion. The reception pedestal 45 has an inner diameter smaller than an outer diameter of the sealing portion 65.

The downstream portion 43 is connected to the front WW 101 via a piping. The downstream portion 43 is provided with a first outlet-side end portion 46 at a downstream end portion.

The second pipe 50 extends along a second axis B intersecting the first axis A. In the shown example, the second pipe 50 extends in a direction orthogonal to the first pipe 40. In the example shown in FIG. 4, the cleaning liquid flows through the second pipe 50 from left to right. The second pipe 50 is provided with an inlet-side end portion 51 on an upstream side (left side). The inlet-side end portion 51 is connected to the front pump 112 via a piping. The second pipe 50 is provided with a second outlet-side end portion 52 on a downstream side (right side). The second outlet-side end portion 52 is connected to the second electromagnetic valve 22 via a piping. The second pipe 50 merges with the first pipe 40 between the inlet-side end portion 51 and the second outlet-side end portion 52.

Figure 7:
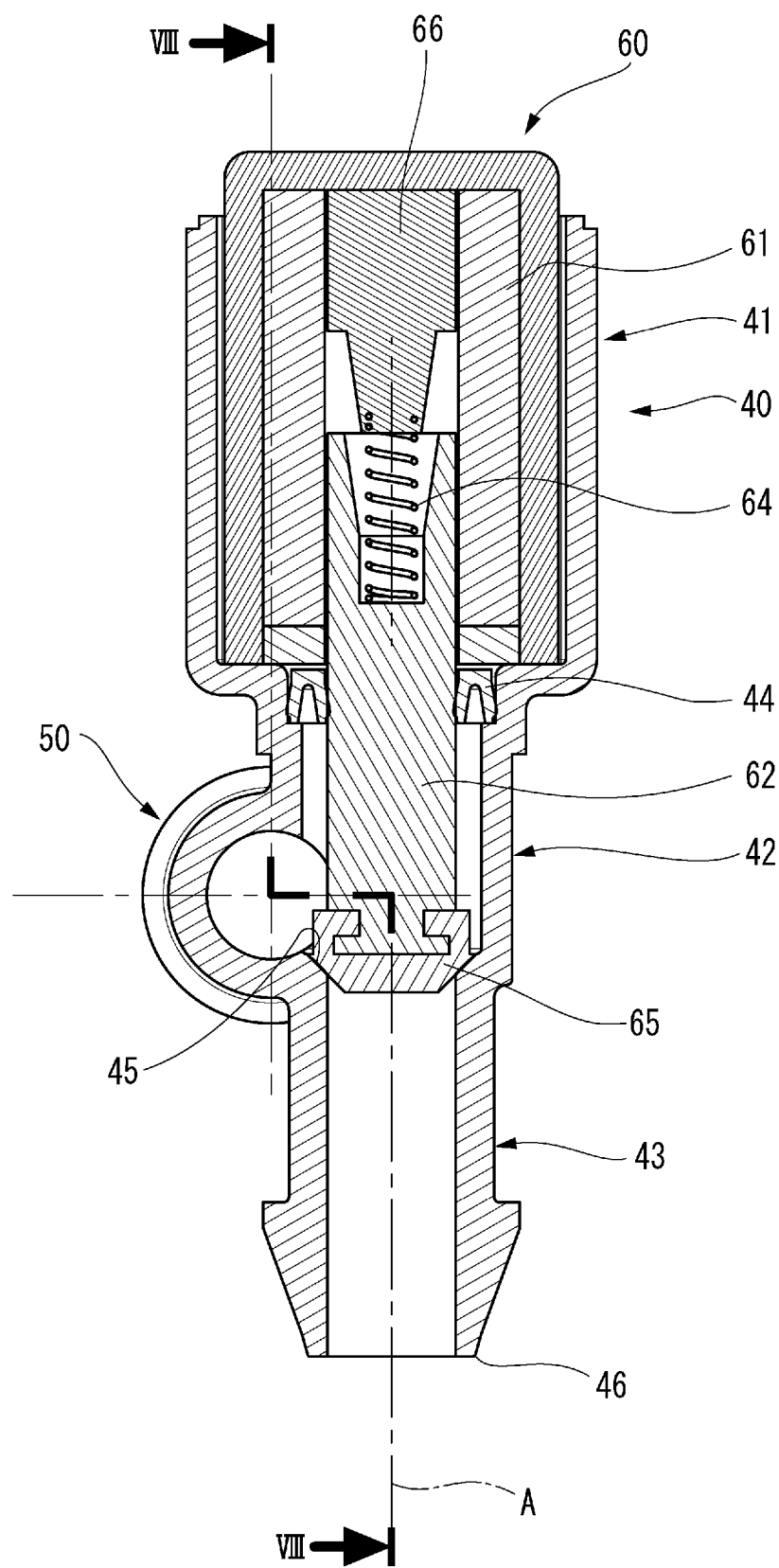
FIG. 7 is a sectional view in a second state taken along the line V-V of FIG. 4.
Figure 8:
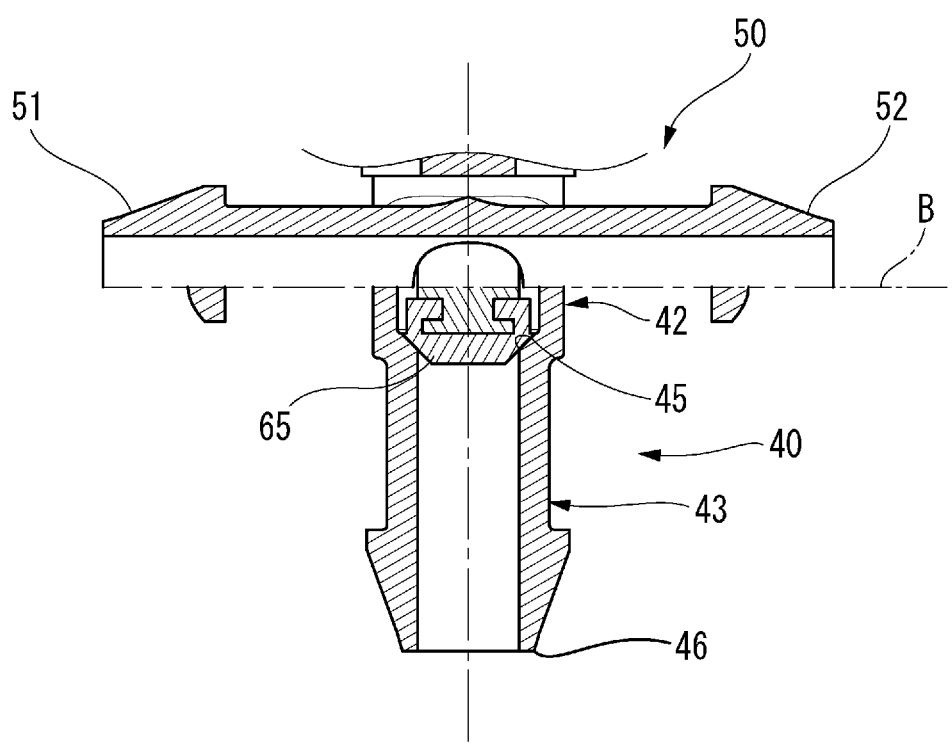
FIG. 8 is a sectional view taken along a line VIII-VIII of FIG. 7.

FIG. 7 is a sectional view in the second state taken along the line V-V of FIG. 4. FIG. 8 is a sectional view taken along a line VIII-VIII of FIG. 7. As shown in FIGS. 5 and 7, the sealing portion 65 is linearly movable along the first axis A of the first pipe 40. The sealing portion 65 is movable between a position where the sealing portion 65 is in close contact with the reception pedestal 45 and a position where the sealing portion 65 is separated from the reception pedestal 45. As shown in FIGS. 7 and 8, when the sealing portion 65 comes into close contact with the reception pedestal 45, the cleaning liquid is prevented from flowing from the upstream portion 42 to the downstream portion 43.

In a normal state in which the coil 61 is not energized, the first electromagnetic valve 21 is in a closed state shown in FIGS. 7 and 8. In the closed state, a pressing force of the spring 64 via the sealing portion 65 and the hydrostatic pressure of the cleaning liquid stored in the upstream portion 42 act to press the sealing portion 65 against the reception pedestal 45. When the movement of the cleaning liquid is blocked at the second outlet-side end portion 52 of the second pipe 50, for example, when the second electromagnetic valve 22 is in a closed state, the sealing portion 65 is pressed against the reception pedestal 45 by the hydrostatic pressure of the cleaning liquid accumulated in the upstream portion 42. Even when the second electromagnetic valve 22 is in an open state, the hydrostatic pressure of the total pressure of the cleaning liquid flowing through the second pipe 50 acts to press the sealing portion 65 against the reception pedestal 45.

When the coil 61 is energized, a force (upward force in FIG. 5) to approach the coil 61 is generated in the movable element 62. The movable element 62 moves upward in FIG. 5 while compressing the spring 64 against an elastic force of the spring 64. At this time, the sealing portion 65 is separated from the reception pedestal 45, and the cleaning liquid flows from the second pipe 50 to a first outlet-side of the first pipe 40.

In this way, according to the electromagnetic valve of the present embodiment, in the normal state in which the coil 61 is not energized, the pressing force of the spring 64 by the sealing portion 65 and the hydrostatic pressure of the cleaning liquid stored in the upstream portion 42 act to press the sealing portion 65 against the reception pedestal 45, and the closed state is maintained. That is, since the hydrostatic pressure acts on the sealing portion 65, the pressing force of the spring 64 that presses the sealing portion 65 against the reception pedestal 45 to maintain the closed state may be not large. Accordingly, it is not necessary to set a large force to attract the movable element 62 to the coil 61 for bringing the first electromagnetic valve 21 into an open state. For this reason, it is not necessary to set a large quantity of current to the coil 61. The size of a power source unit that energizes the coil 61 can be reduced, it is not necessary to provide a radiator for promoting heat radiation of the coil 61, and the cleaner system 100 can be configured in a compact manner.

Figure 9:
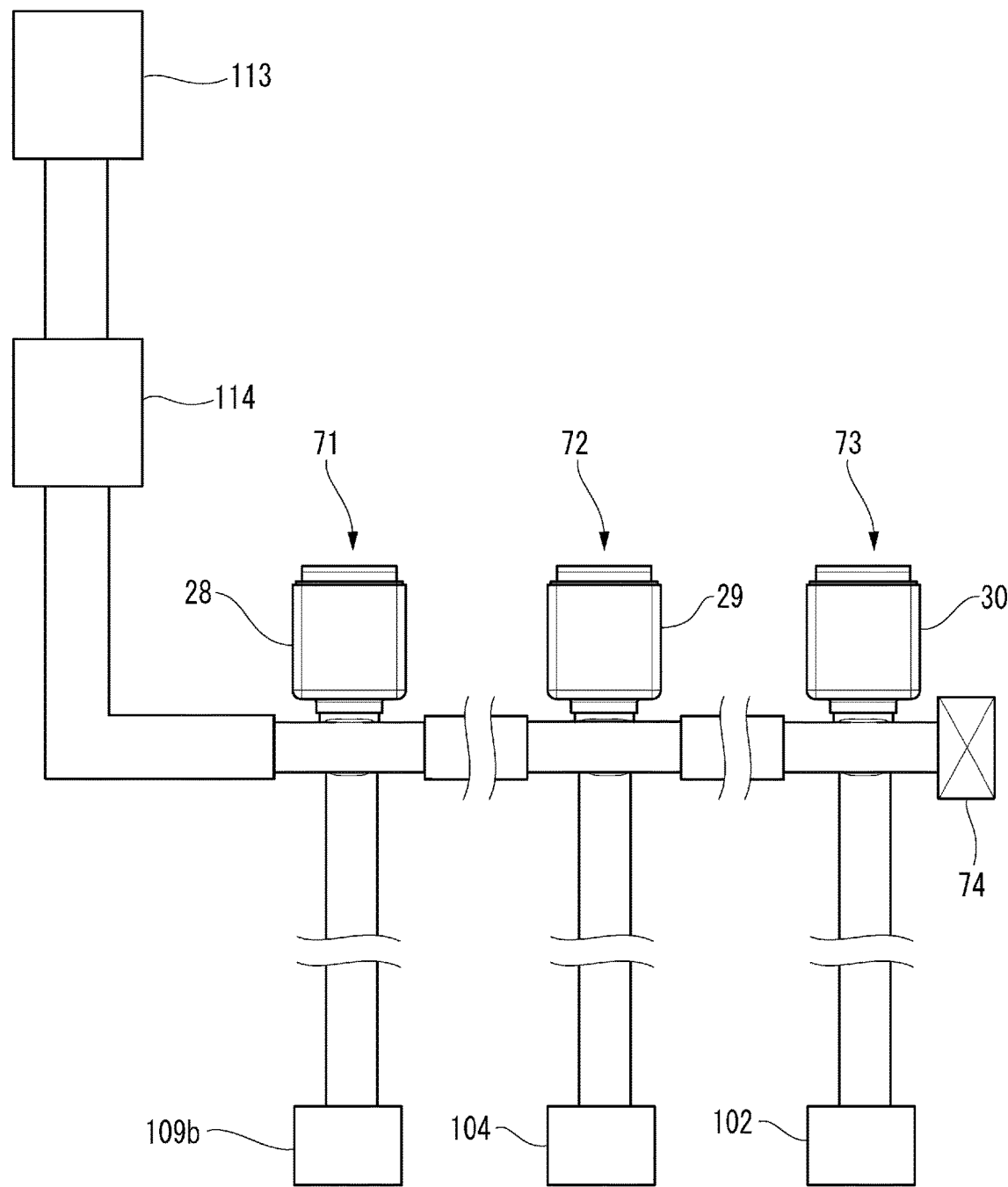
FIG. 9 is a schematic diagram showing a state in which an eighth electromagnetic valve to a tenth electromagnetic valve are connected to a back pump, a back camera cleaner, a back LC, and a back WW.

FIG. 9 is a schematic diagram showing a state in which the eighth electromagnetic valve 28 to the tenth electromagnetic valve 30 are connected to the back pump 114, the back camera cleaner 109b, the back LC 104, and the back WW 102. As shown in FIG. 9, the cleaner system 100 includes an upstream-side branch portion 71 including the eighth electromagnetic valve 28 having the above-described structure, the back tank 113 that is connected to the inlet-side end portion 51 of the eighth electromagnetic valve 28 of the upstream-side branch portion 71 and stores the cleaning liquid, an upstream-side cleaner unit (back camera cleaner 109b) connected to the first outlet-side end portion 46 of the eighth electromagnetic valve 28 of the upstream-side branch portion 71, a downstream-side branch portion 73 including the tenth electromagnetic valve 30 having the above-described structure, a connection portion 72 that connects the second outlet-side end portion 52 of the eighth electromagnetic valve 28 of the upstream-side branch portion 71 and the inlet-side end portion 51 of the tenth electromagnetic valve 30 of the downstream-side branch portion 73, a downstream-side cleaner unit (back WW 102) connected to the first outlet-side end portion 46 of the tenth electromagnetic valve 30 of the downstream-side branch portion 73, and a closing portion 74 that is provided at the second outlet-side end portion 52 of the tenth electromagnetic valve 30 of the downstream-side branch portion 73, and prevents the cleaning liquid from being discharged to the outside from the second outlet-side end portion 52 of the tenth electromagnetic valve 30.

In the shown cleaner system 100, the connection portion 72 constitutes an intermediate branch portion including the ninth electromagnetic valve 29. The connection portion 72 may include a plurality of electromagnetic valves.

The second outlet-side end portion 52 of the tenth electromagnetic valve 30 is blocked by the closing portion 74. Therefore, in the tenth electromagnetic valve 30, the cleaning liquid does not flow out from the second outlet-side end portion 52 in either the open state or the closed state. That is, by switching between the open state and the closed state of the tenth electromagnetic valve 30, it is possible to switch between permission and non-permission of the discharge of the cleaning liquid to the back WW 102. Since the second outlet-side end portion 52 is normally blocked by the closing portion 74, when the tenth electromagnetic valve 30 is in the closed state, the total pressure (hydrostatic pressure) of the cleaning liquid accumulated in the merging portion acts on the sealing portion 65.

Since the cleaner system 100 according to the present embodiment includes a plurality of electromagnetic valves with low power consumption, power to be consumed is low.

In this way, the plurality of electromagnetic valves may be connected to each other in such a manner that the first outlet-side end portion 46 of an upstream electromagnetic valve is connected to the inlet-side end portion 51 of a downstream electromagnetic valve. With such a configuration, the vehicle cleaner system 100 switchable between individual permission and non-permission of the supply of the cleaning liquid to the plurality of cleaners is provided.

Figure 10:
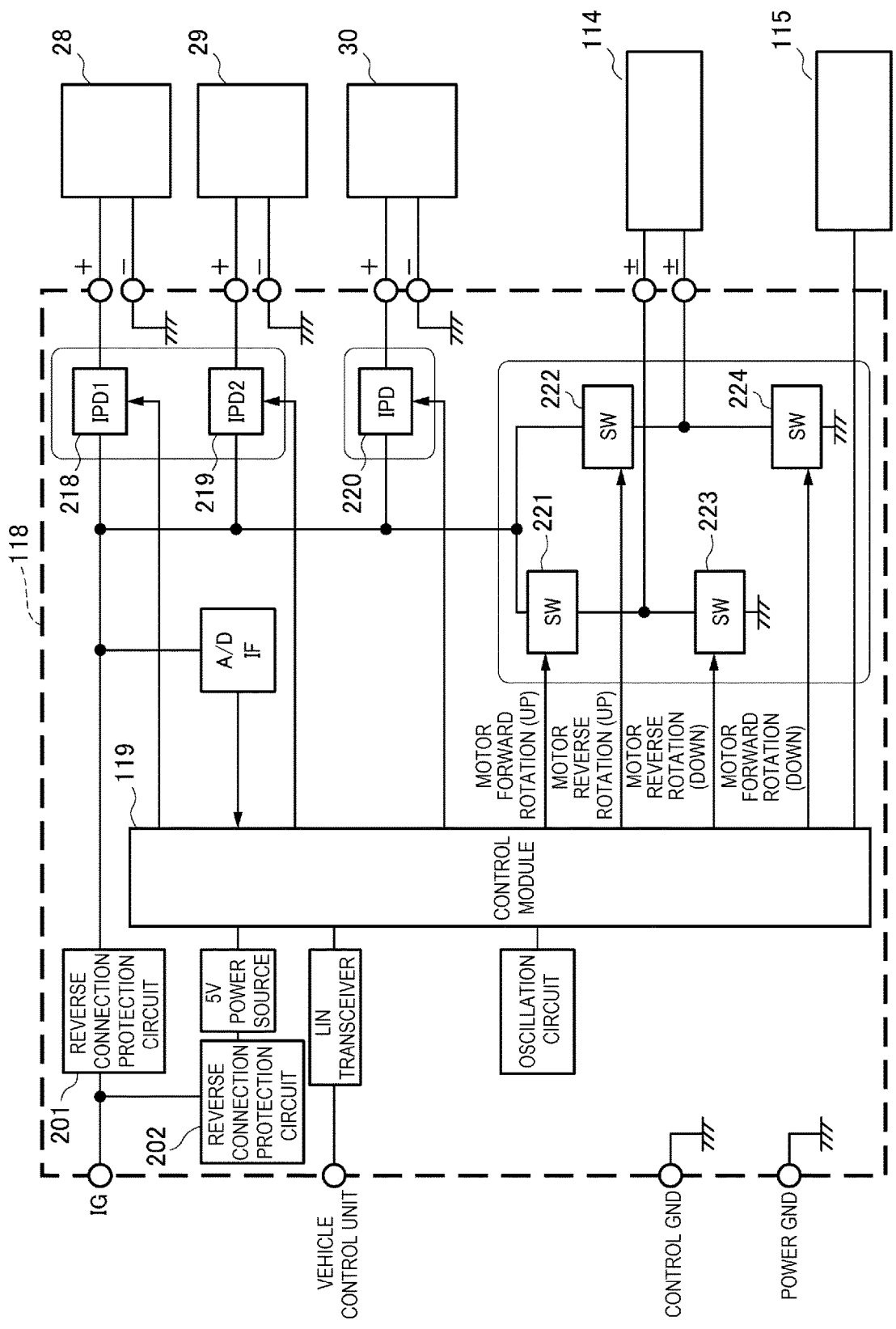
FIG. 10 shows a control circuit that drives the back pump and the eighth electromagnetic valve to the tenth electromagnetic valve.

FIG. 10 shows a control circuit 118 that drives the back pump 114 and the eighth electromagnetic valve 28 to the tenth electromagnetic valve 30. The control circuit 118 is a part of the cleaner control unit 116. As shown in FIG. 10, the control circuit 118 includes a control module 119, a plurality of intelligent power devices (IPDs), a plurality of reverse connection protection circuits 201, 202, and a plurality of switches 221 to 224.

The back pump 114 is connected to a power source IG and the control module 119 via the plurality of switches 221 to 224. When the control module 119 appropriately switches among the switches 221 to 224, the back motor pump 114 can rotate between forward rotation and reverse rotation.

Coils 61 of the eighth electromagnetic valve 28 to the tenth electromagnetic valve 30 are connected to the power source IG via the IPDs 218 to 220 and the reverse connection protection circuits 201, 202. The reverse connection protection circuits 201, 202 are provided between the power source IG and the eighth IPD 218. The eighth IPD 218 is provided between the reverse connection protection circuits 201, 202 and the eighth electromagnetic valve 28.

Each of the IPDs 218 to 220 is connected to the power source IG, a respective one of the electromagnetic valves 28 to 30, and the control module 119. The IPDs 218 to 220 protect the electromagnetic valves 28 to 30 connected to respective output sides of the IPDs 218 to 220 when an overvoltage and an overcurrent are input from the power source IG. When a short circuit and an open circuit occur in the electromagnetic valves 28 to 30, the IPDs 218 to 220 output a signal indicating the short circuit and the open circuit of the electromagnetic valves 28 to 30 to the control module 119. For example, when an overcurrent is input from the power source IG, the eighth IPD 218 prevents the overcurrent from flowing through the eighth electromagnetic valve 28 and protects the eighth electromagnetic valve 28. Further, when the ninth electromagnetic valve 29 is open-circuited, the ninth IPD 219 outputs a signal indicating the open circuit of the ninth IPD 219 to the control module 119.

The control module 119 is connected to the vehicle control unit 3 via a communication line. The control module 119 outputs the short circuit and the open circuit of electromagnetic valves 28 to 30 to the vehicle control unit 3 based on signals indicating the short circuit and the open circuit of the electromagnetic valves 28 to 30 acquired from the IPDs 218 to 220. For example, when a signal indicating that the eighth electromagnetic valve 28 is short-circuited is output from the eighth IPD 218, the control module 119 outputs to the vehicle control unit 3 a signal indicating that the eighth electromagnetic valve 28 is short-circuited.

In this way, according to the vehicle cleaner system 100 of the present embodiment, states of the electromagnetic valves can be recognized by the IPDs 218 to 220 (protection diagnosis units). That is, it is possible to always recognize an available cleaner. For this reason, the vehicle control unit 3 can perform control suitable for the status of the cleaner. For example, the vehicle control unit 3 may not execute the automatic driving mode when the front camera cleaner 109a that washes the front camera 6c fails, and may execute the automatic driving mode when the back camera cleaner 109b that washes the back camera 6d fails. In this way, the control module 119 recognizes a failed cleaner and transmits information on the failed cleaner to the vehicle control unit 3, so that the vehicle control unit 3 can perform control suitable for the status of the cleaner.

As shown in FIG. 10, the vehicle cleaner system 100 may further include a residual amount meter 115 that notices that a residual amount of the cleaning liquid stored in the back tank 113 is equal to or less than a predetermined value. The control module 119 may output the notice from the residual amount meter 115 to the vehicle control unit 3 when the residual amount of the cleaning liquid is equal to or less than the predetermined value.

When the control module 119 transmits the shortage of the residual amount in the tank to the vehicle control unit 3 together with the failure of a cleaner, the vehicle control unit 3 can perform control so that the automatic driving mode is not executed when the residual amount in the tank is insufficient.

In the above-described embodiment, the vehicle cleaner system 100 including the back pump 114 and the eighth electromagnetic valve 28 to the tenth electromagnetic valve 30 are described with reference to FIGS. 9 and 10. Alternatively, the vehicle cleaner system 100 including the front pump 112 and the first electromagnetic valve to the seventh electromagnetic valve may also include the control circuit 118 using the IPDs.

In the above-described embodiment, the vehicle cleaner system 100 including the first electromagnetic valve 21 to the seventh electromagnetic valve 27 that switch the discharge of the cleaning medium supplied from the front pump 112 and the vehicle cleaner system 100 including the eighth electromagnetic valve 28 to the tenth electromagnetic valve 30 that switch the discharge of the cleaning medium supplied from the back pump 114 are configured as vehicle cleaner systems 100 independent of each other. Alternatively, the present invention is not limited thereto. The vehicle cleaner system 100 may be configured such that the single cleaner control unit 116 controls the first electromagnetic valve 21 to the seventh electromagnetic valve 27 that switch the discharge of the cleaning medium supplied from the front pump 112 and the eighth electromagnetic valve 28 to the tenth electromagnetic valve 30 that switch the discharge of the cleaning medium supplied from the back pump 114.

In the vehicle cleaner system 100 according to the present embodiment, the influence of failure of an electromagnetic valve is less likely to spread at the time of failure. In the present embodiment, the control module 119 stops the back pump 114 (motor pump) when a signal indicating a short circuit or an open circuit of the electromagnetic valves 28 to 30 is acquired from the IPDs 218 to 220. For example, when the control module 119 acquires from the eighth IPD 218 a signal indicating that the eighth electromagnetic valve 28 is short-circuited or open-circuited, the control module 119 turns off the switches 221 to 224 to stop the operation of the back pump 114.

According to such a configuration, even when one of the electromagnetic valves 21 to 30 is short-circuited and does not operate, it is possible to reduce an adverse effect on other components. For example, it is assumed that the ninth electromagnetic valve 29 is short-circuited and is not opened in a closed state. As shown in FIG. 3, the eighth electromagnetic valve 28 is connected to the pipe between the back pump 114 and the ninth electromagnetic valve 29.

At this time, when the back pump 114 continues operating even though the ninth electromagnetic valve 29 is not opened, the liquid pressure of the cleaning liquid in the pipe between the back pump 114 and the ninth electromagnetic valve 29 is excessively high, and the high pressure acts on the back pump 114 and the eighth electromagnetic valve 28. For this reason, in addition to the ninth electromagnetic valve 29, the back pump 114 and the eighth electromagnetic valve 28 may also fail.

According to the vehicle cleaner system 100 of the present invention, since the back pump 114 is stopped operating when the short circuit or the open circuit of one of the electromagnetic valves 28 to 30 is detected, the adverse effect is less likely to spread to the back pump 114 and the other electromagnetic valves 28 to 30.

The control module 119 may perform failure diagnosis by energizing an electromagnetic valve indicating a short circuit or an open circuit while stopping the back pump 114. When the back pump 114 is stopped, the liquid pressure of the cleaning medium does not increase, and the adverse effect is less likely to spread to the other components.

When a cleaner system as disclosed in Patent Literature 1 is mounted on a vehicle, the cleaner system is required to include a small electromagnetic valve. The electromagnetic valve is opened and closed by an electromagnetic force generated by a coil. When the size of the electromagnetic valve is reduced, the heat generated in the coil when the electromagnetic force is generated is less likely to dissipate, leading to deteriorated responsiveness. Therefore, according to the present invention, there is provided a vehicle cleaner system including an electromagnetic valve having good responsiveness.

Figure 11A:
FIGS. 11A to 11C are timing charts when an electromagnetic valve according to a comparative example is opened.
Figure 11B:
Figure 11C:

In the vehicle cleaner system 100 configured as described above, the cleaner control unit 116 controls energization of the electromagnetic valves 21 to 30 to open the electromagnetic valves 21 to 30. FIGS. 11A to 11C are timing charts when the electromagnetic valves 21 to 30 according to a comparative example are opened. FIG. 11A shows a signal for operating a cleaner acquired by the cleaner control unit 116 from the vehicle control unit 3. FIG. 11A shows that the cleaner control unit 116 acquires an ON signal for operating a cleaner after acquiring an OFF signal for not operating a cleaner. In FIG. 11B shows a change in a voltage applied to the electromagnetic valves 21 to 30. FIG. 11C shows a temperature change of the coils 61 of the electromagnetic valves 21 to 30. As shown in FIGS. 11A to 11C, when electric power is continuously supplied to the electromagnetic valves 21 to 30 to open the electromagnetic valves 21 to 30, heat is generated in the coils 61 of the electromagnetic valves 21 to 30 and the temperature of the coils 61 rises. Even when the high-temperature coils 61 are energized, a predetermined electromagnetic force is hardly generated, and the electromagnetic valves 21 to 30 may not be opened. In this case, since the electromagnetic valves 21 to 30 would not operate again unless a predetermined cooling period elapses, the responsiveness of the electromagnetic valves 21 to 30 may deteriorate.

Figure 12A:
FIGS. 12A to 12C are timing charts when an electromagnetic valve according to the present embodiment is opened.
Figure 12B:
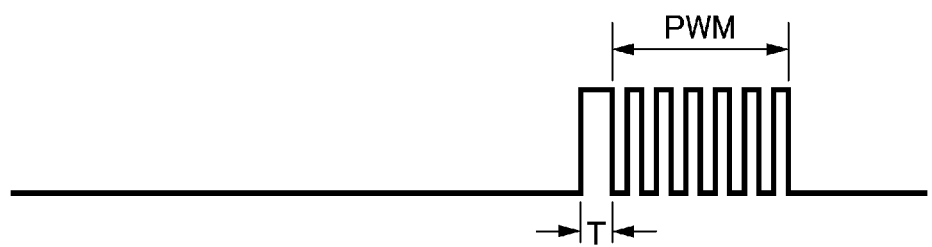
Figure 12C:

Therefore, in the vehicle cleaner system 100 according to the present embodiment, the cleaner control unit 116 performs pulse width modulation (PWM) control after the electromagnetic valves 21 to 30 (normally closed electromagnetic valves) are opened. FIGS. 12A to 12C are timing charts when the electromagnetic valves 21 to 30 according to the present embodiment are opened. FIG. 12A shows a cleaner operation signal acquired by the cleaner control unit 116 from the vehicle control unit 3. FIG. 12A shows that the cleaner control unit 116 acquires an ON signal for operating a cleaner after acquiring an OFF signal for not operating a cleaner. FIG. 12B shows a change in a voltage applied to the electromagnetic valves 21 to 30. FIG. 12C shows a temperature change of the coils of the electromagnetic valves 21 to 30.

To open the electromagnetic valves 21 to 30, each of the coils 61 is energized to move the sealing portion 65 to a position completely separated from the reception pedestal 45. When the coil 61 is energized, the movable element 62 is moved to a limit position where the movable element 62 cannot be moved further in a direction opposite to the reception pedestal 45. A state in which the movable element 62 is moved to the limit position is the open state. A state in which the sealing portion 65 is in close contact with the reception pedestal 45 is the closed state. A state from the closed state to the open state is referred to as a transition state.

For example, each of the electromagnetic valves 21 to 30 is provided with a stopper 66 that restricts the movement of the movable element 62 to a side opposite to the reception pedestal 45 (see FIGS. 5 and 7). The position where a back end of the movable element 62 abuts against the stopper 66 is the limit position. Depending on structures of the electromagnetic valves 21 to 30, the limit position of the movable element 62 may also be determined not by the stopper 66 but by a protruding portion provided inside the housing portion 41.

As shown in FIG. 12A, it is assumed that the cleaner control unit 116 acquires a signal for operating a cleaner in one second from the vehicle control unit 3. First, the cleaner control unit 116 continuously supplies a large current to the electromagnetic valves 21 to 30 for predetermined time to change a state from the closed state to the open state. This is to quickly bring the electromagnetic valves 21 to 30 into the open state by continuously supplying as large electric power as possible to the coils 61. In general, the cleaner control unit 116 continuously applies a maximum voltage that may be supplied by the cleaner control unit 116 to the coils 61.

When the electromagnetic valves 21 to 30 are opened, the cleaner control unit 116 performs the PWM control as shown in FIG. 12A. A force required to maintain the movable element 62 in the limit position of the open state is smaller than a force required to move the movable element 62 from the position in close contact with the reception pedestal 45 to the limit position. That is, when the movable element 62 is moved to the limit position, an energization amount to the coils 61 may be reduced. Therefore, in the present embodiment, the cleaner control unit 116 performs the PWM control after the electromagnetic valves 21 to 30 are opened. In other words, when the signal for operating a cleaner is acquired, the cleaner control unit 116 first continuously energizes the electromagnetic valves 21 to 30 into the open state, and performs the PWM control after a predetermined period T since the signal for operating a cleaner is acquired. For this reason, the energization amount supplied to the coils 61 while the open state is maintained is small, and the coils 61 are less likely to generate heat. Therefore, the responsiveness of the electromagnetic valves 21 to 30 is less likely to deteriorate. The PWD control is performed after the electromagnetic valves 21 to 30 are opened, and is not performed until the electromagnetic valves 21 to 30 are opened from the closed state. Therefore, the electromagnetic valves 21 to 30 can be quickly brought into the open state, and the responsiveness when the electromagnetic valves 21 to 30 are brought into the open state from the closed state is not impaired.

In FIGS. 12A to 12C, in a period in which the cleaner operation signal is received, the cleaner control unit 116 performs the continuous energization for the predetermined period T immediately after the cleaner operation signal is acquired, and performs the PWM control after the predetermined period T. However, time required for the vehicle control unit 3 to request the cleaner control unit 116 to continue operating the cleaner is longer than the predetermined period T.

Each of the electromagnetic valves 21 to 30 may be provided with a sensor capable of detecting whether the movable element 62 of each of the electromagnetic valves 21 to 30 reaches the limit position, and the PWM control may be performed from the continuous energization when acquiring an output of the sensor. However, it is preferable that no such sensor is mounted, that the continuous energization is first performed for the predetermined period T after the cleaner operation signal is acquired, and that the PWM control is performed after the predetermined period T.

The predetermined period T for continuous energization (period from the acquisition of the cleaner operation signal to the start of the PWM control) can be determined according to time for moving the movable element 62 from the position in close contact with the reception pedestal 45 in the closed state to the limit position in the open state and time until the electromagnetic force of the coils 61 decreases according to the temperature rise. The predetermined period T during the continuous energization varies depending on characteristics of the electromagnetic valves 21 to 30, attachment states of the electromagnetic valves 21 to 30 to the vehicle, and the like, and is preferably about 0.5 seconds or less.

As shown in FIGS. 12A to 12C, according to the vehicle cleaner system 100 of the present embodiment, the PWM control is performed after the electromagnetic valves 21 to 30 are brought into the open state. Accordingly, the electromagnetic valves 21 to 30 can be maintained in the open state while maintaining a low energization amount supplied to the electromagnetic valves 21 to 30. For this reason, the temperature of the electromagnetic valves 21 to 30 is less likely to become high, and the responsiveness of the electromagnetic valves 21 to 30 is less likely to decrease.

A duty ratio of the PWM control is preferably 30% or more. When the duty ratio is less than 30%, it may be difficult to continuously maintain the electromagnetic valves 21 to 30 in the open state.

The duty ratio of the PWM control is preferably 70% or less. When the duty ratio is more than 70%, an amount of heat generated by energization becomes excessively larger than an amount of heat radiated from the coils 61, and the temperature of the coils 61 may become excessively high.

Various Modifications

Although the embodiment of the present invention has been described above, it is needless to say that the technical scope of the present invention should not be interpreted as being limited to the description of the present embodiment. It is to be understood by those skilled in the art that the present embodiment is merely an example and various modifications may be made within the scope of the invention described in the claims. The technical scope of the present invention should be determined based on the scope of the inventions described in the claims and an equivalent scope thereof.

In the present embodiment, the driving mode of the vehicle includes the fully automatic driving mode, the advanced driving support mode, the driving support mode, and the manual driving mode. Alternatively, the driving mode of the vehicle should not be limited to these four modes. The driving mode of the vehicle may include at least one of these four modes. For example, only one driving mode of the vehicle may be executed.

Further, a classification and a display form of the driving mode of the vehicle may be appropriately changed according to laws or regulations related to automatic driving in different countries. Similarly, definitions of the "fully automatic driving mode", the "advanced driving support mode", and the "driving support mode" described in the description of the present embodiment are merely examples and may be appropriately changed according to laws or rules related to automatic driving in different countries.

The above-described embodiment described an example in which the cleaner system 100 is mounted on a vehicle capable of automatic driving. Alternatively, the cleaner system 100 may be mounted on a vehicle incapable of automatic driving.

The above-described embodiment described an example in which the cleaners 101, 103, and 105 to 109a are connected to the front tank 111 and the cleaners 102, 104, and 109b are connected to the back tank 113. Alternatively, the present invention is not limited thereto.

The cleaners 101 to 109b may be connected to a single tank. The cleaners 101 to 109b may be connected to different tanks.

Alternatively, the cleaners 101 to 109b may be connected to a common tank for each type of objects to be cleaned. For example, the cleaners 103 to 106 for cleaning the LiDARs may be connected to a first common tank, and the cleaners 107 and 108 for cleaning the headlamps may be connected to a second tank different from the first tank.

Alternatively, the cleaners 101 to 109b may be connected to a common tank for each arrangement position of objects to be cleaned. For example, the front WW 101, the front LC 103, and the front camera cleaner 109a may be connected to a front common tank, the right LC 105 and the right HC 107 may be connected to a right common tank, the back WW 102, the back WW 104, the back camera cleaner 109b may be connected to a back common tank, and the left LC 106 and the left HC 108 may be connected to a left common tank.

The above-described embodiment described, as shown in FIG. 3, an example in which the front pump, the front WW, the front LC, the right LC, the left LC, the right HC, the left HC, and the cleaner for cleaning the front camera cleaner constitute one unit, and the back pump, the back camera cleaner, the back LC, and the back WW constitute another unit. The present invention is not limited thereto. An order in which objects to be cleaned are connected to the front pump or the back pump is not limited to this example. The above-described embodiment described, as shown in FIG. 3, an example in which one cleaner is connected downstream of one electromagnetic valve. The present invention is not limited thereto. A plurality of cleaners may be connected downstream of one electromagnetic valve. A plurality of cleaners for cleaning objects to be cleaned that are often cleaned at the same time may be connected downstream of one electromagnetic valve.

The present application is based on a Japanese patent application (No. 2019-009592) filed on Jan. 23, 2019, a Japanese patent application (No. 2019-009593) filed on Jan. 23, 2019, and a Japanese patent application (No. 2019-009594) filed on Jan. 23, 2019, contents of which are incorporated herein by reference.

INDUSTRIAL APPLICABILITY

According to the present invention, there is provided a vehicle cleaner system capable of recognizing a failed cleaner.

REFERENCE SIGNS LIST 1 vehicle
2 vehicle system
3 vehicle control unit 21 to 30 electromagnetic valve
40 first pipe
41 housing portion
42 upstream portion
43 downstream portion
44 seal member
45 reception pedestal
46 first outlet-side end portion
50 second pipe
51 inlet-side end portion
52 second outlet-side end portion
60 solenoid
61 coil
62 movable element
63 yoke
64 spring
65 sealing portion
71 upstream-side branch portion
72 connection portion
73 downstream-side branch portion
74 closing portion
100 vehicle cleaner system
100 cleaner system
101 to 109b cleaner
111 front tank
112 front pump
113 back tank
114 back pump
115 residual amount meter
116 cleaner control unit
118 control circuit
119 control module
201, 202 reverse connection protection circuit
218 to 220 protection diagnosis unit
221 to 224 switch

The invention claimed is:

1. A vehicle cleaner system comprising:
a plurality of cleaner units that discharge cleaning liquid toward objects configured to be cleaned mounted on a vehicle capable of traveling in an automatic driving mode;
a motor pump that supplies the cleaning liquid to the cleaner units;
electromagnetic valves that are each provided between a respective one of the cleaner units and the motor pump, the electromagnetic valves being configured to switch between permission and non-permission of movement of the cleaning liquid from the motor pump to the cleaner units;
a control module that controls the electromagnetic valves and the motor pump; and
a plurality of protection diagnosis units that are each provided in an electrical connection of a respective one of the electromagnetic valves and the control module, the plurality of protection diagnosis units being configured to protect an overcurrent from flowing through the electromagnetic valves when the electromagnetic valves are short-circuited or open-circuited and transmit a signal indicating the short circuit and the open circuit of the electromagnetic valves to the control module,
wherein the control module outputs information on an unavailable electromagnetic valve to a vehicle control unit such that the vehicle control unit adjusts controls of the vehicle in accordance with the signal acquired from the protection diagnosis units.

2. The vehicle cleaner system according to claim 1, further comprising:
a tank that is connected to the motor pump and stores the cleaning liquid; and
a residual amount meter that notices that a residual amount of the cleaning liquid stored in the tank is equal to or less than a predetermined value,
wherein the control module outputs the notice to the vehicle control unit when the residual amount of the cleaning liquid from the residual amount meter is equal to or less than the predetermined value.

3. A vehicle cleaner system comprising:
a plurality of cleaner units that discharge cleaning liquid toward objects configured to be cleaned mounted on a vehicle;
a motor pump that supplies the cleaning liquid to the cleaner units;
normally closed electromagnetic valves that are each provided between a respective one of the cleaner units and the motor pump, the electromagnetic valves being configured to switch between permission and non-permission of movement of the cleaning liquid from the motor pump to the cleaner units;
a control module that controls energization from a power source to the normally closed electromagnetic valves and the motor pump to control the normally closed electromagnetic valves and the motor pump; and
a plurality of protection diagnosis units that are each provided in an electrical connection of a respective one of the electromagnetic valves and the control module, the plurality of protection diagnosis units being configured to protect an overcurrent from flowing through the electromagnetic valves when the electromagnetic valves are short-circuited and open-circuited and transmit a signal indicating the short circuit and the open circuit of the electromagnetic valves to the control module,
wherein the control module stops the motor pump when the signal indicating the short circuit and the open circuit of the electromagnetic valves is acquired from the protection diagnosis units.

4. The vehicle cleaner system according to claim 3, wherein the control module energizes the electromagnetic valves indicating the short circuit and the open circuit and performs failure diagnosis while stopping the motor pump.

5. A vehicle cleaner system comprising:
a plurality of cleaner units that discharge cleaning liquid toward objects mounted on a vehicle;
a motor pump that supplies the cleaning liquid to the cleaner units;
normally closed electromagnetic valves that are each provided between a respective one of the cleaner units and the motor pump, the electromagnetic valves being configured to switch between permission and non-permission of movement of the cleaning liquid from the motor pump to the cleaner units;
a cleaner control unit that controls energization from a power source to the normally closed electromagnetic valves to control opening and closing of the normally closed electromagnetic valves,
wherein the cleaner control unit performs PWM control after the normally closed electromagnetic valves are opened at a duty ratio of 30% or more and 70% or less.

* * * * *